United States Patent Office 2,905,071
Patented Sept. 22, 1959

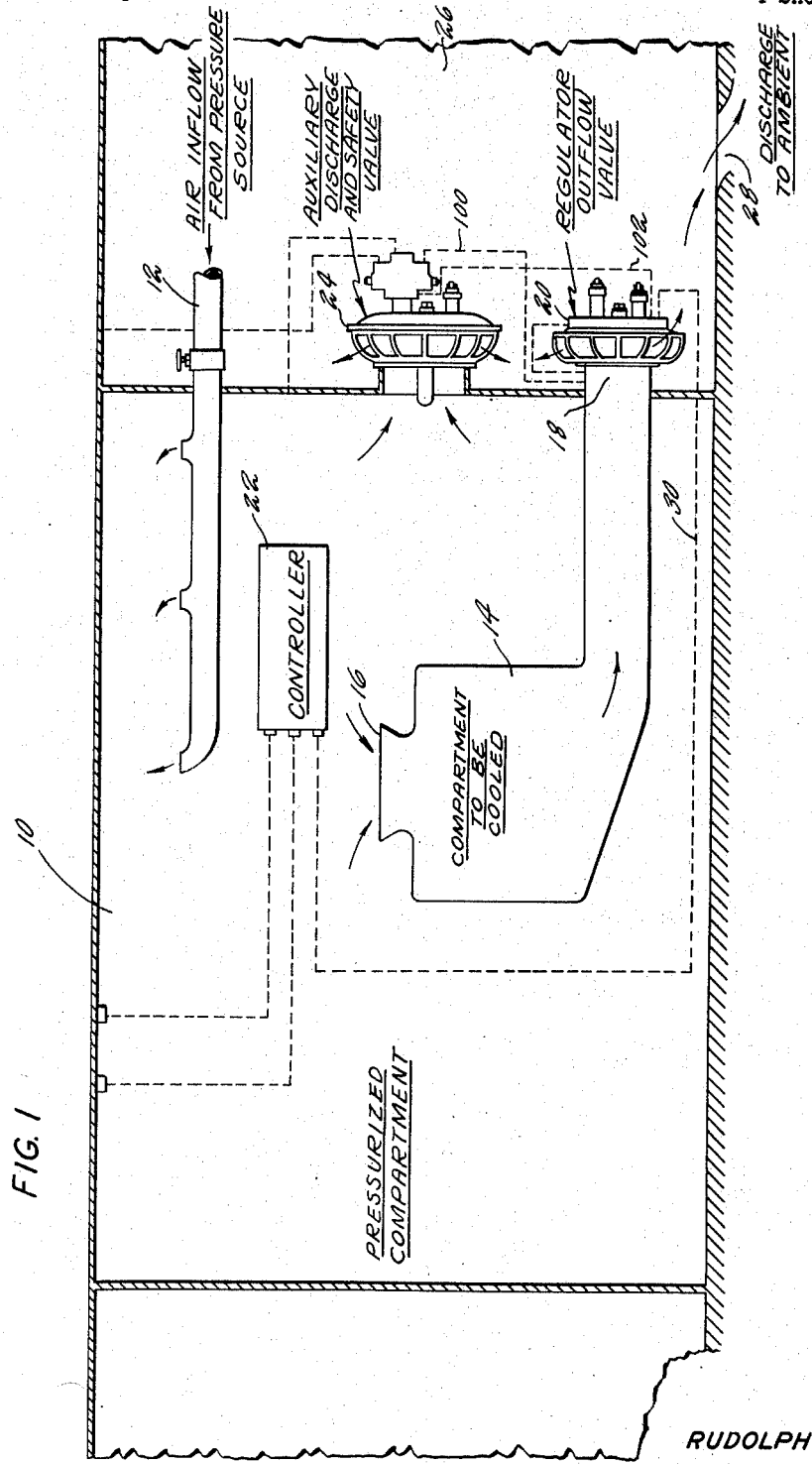

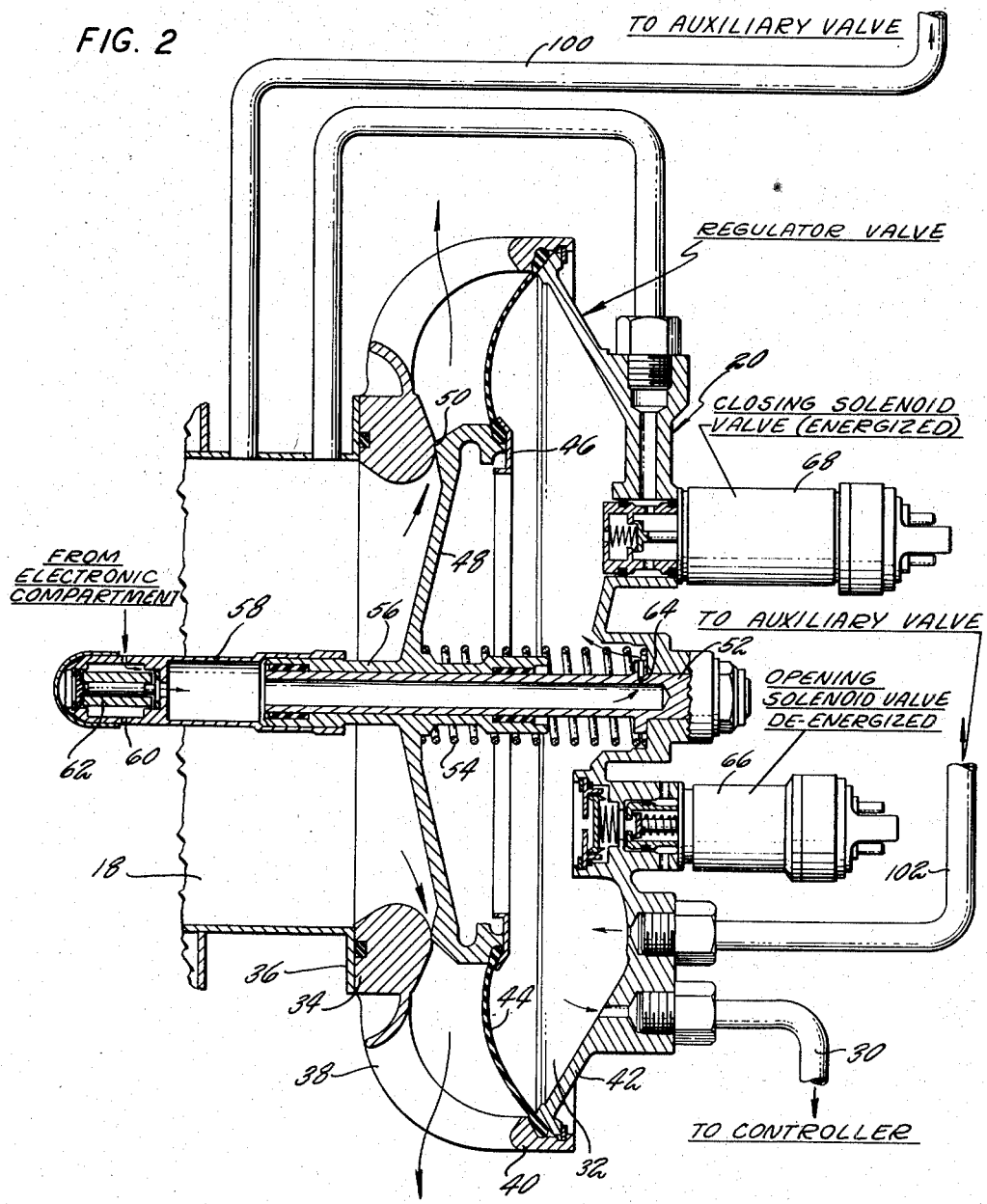

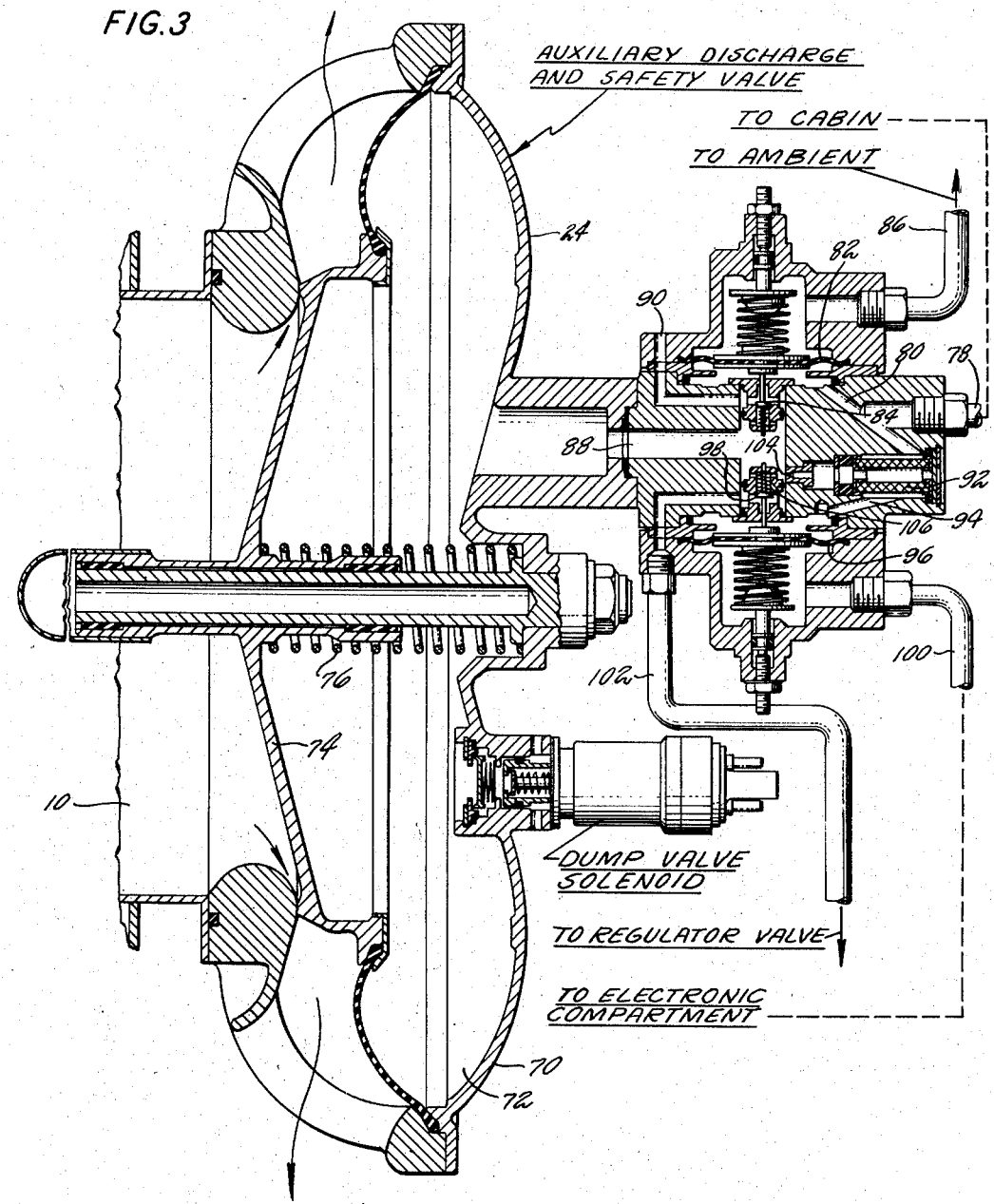

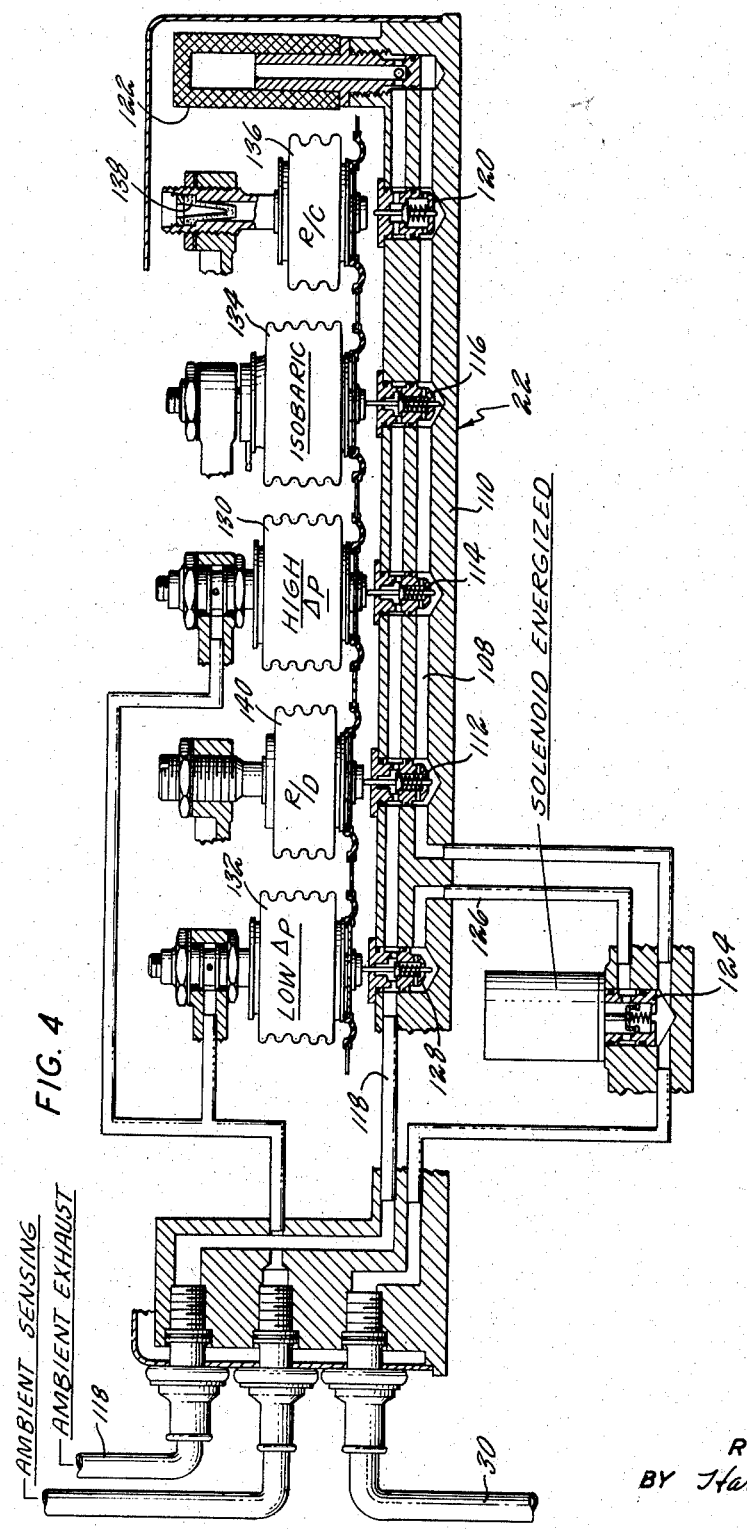

2,905,071

PRESSURE CONTROL MECHANISM

Rudolph E. Krueger, Burbank, Calif., assignor to United Aircraft Corporation, East Hartford, Conn., a corporation of Delaware Application April 23, 1957, Serial No. 654,599

27 Claims. (Cl. 98—1.5)

This invention relates to pressure control mechanism and particularly to mechanism for control of the air pressure in an aircraft compartment.

Compartments of an aircraft which are occupied by passengers or others may be rendered more comfortable by controlling both the temperature and pressure within the compartment. Air at a controlled temperature may be introduced to the compartment and the mass flow of air to the compartment may be regulated to control the air temperature within the compartment under varying flight conditions. The compartment may be sealed and the mass flow of air from the compartment may be regulated to control the pressure within the compartment. If more air is permitted to flow in than is permitted to flow out of the compartment, the compartment pressure will be increased and if more air is permitted to flow out of the compartment than is permitted to flow in, the pressure will be reduced. No attempt is generally made, however, to reduce the compartment pressure to less than the surrounding atmospheric or ambient pressure.

Air may be supplied to the compartment from any suitable pressure source such as a compressor or supercharger or may be bled from the compressor portion of a compressor-turbine type of engine. A portion of this air may be cooled in a well known manner, as by an expansion turbine and heat exchangers, and the cooled and the heated air mixed in the correct proportion to provide the desired temperature in the compartment. The quantity of air required at the temperatures available will vary greatly with the cooling requirements of the compartment and hence, provision must be made for greatly varying the quantity of air discharged from the compartment in order to regulate the air pressure in the compartment.

In many installations, in addition to the occupied compartment, other compartments such as those containing electronic equipment must be cooled. The discharge from the passenger compartment may be led through the electronic compartment and then discharged overboard.

It is an object of this invention to provide means for controlling the air pressure in the passenger compartment and the electronic compartment.

A further object of this invention is to provide mechanism for regulating the passenger compartment pressure by regulating the flow through the electronic compartment and limiting the flow through the electronic compartment by relieving or venting the passenger compartment.

A further object is the control of pressure in compartments arranged in series utilizing two valves, one of which controls the pressure in both compartments and the other of which limits the pressure drop through the downstream compartment and acts as a safety valve.

A further object of this invention is mechanism utilizing a safety valve as a flow control valve.

A still further object is mechanism connecting the operating mechanism of two pressure regulating main outlet valves arranged in parallel to stabilize their operation.

Other objects and advantages will be apparent from the following specification and the attached drawings in which:

Fig. 1 is a schematic diagram showing the pressurized compartment and the compartment to be cooled arranged in series and the two outlet valves for controlling the air flow and the pressure in the compartments.

Fig. 2 is a side elevation partly in section showing the passenger compartment pressure regulator valve.

Fig. 3 is a side elevation partly in section showing the passenger compartment relief valve and electronic compartment flow limiting valve.

Fig. 4 is an elevation partly in section of the controller for the outflow valves.

In the drawings, and particularly Fig. 1, a sealed chamber or compartment 10 to be pressurized is supplied with air from a suitable pressure source, not shown, through an inlet pipe 12. The temperature, and the mass flow, of air through inlet pipe 12 is regulated in any desired manner by well known equipment, not shown, so as to maintain the compartment 10 at a selected temperature or temperature schedule. As is well known in the art, the quantity of air fed to the compartment 10, in order to maintain this schedule, will vary greatly, particularly where the air is supplied from the compressor section of a gas turbine. The compartment 10 may be any selected compartment or chamber of the airplane, such as the pilot's cockpit or the passenger compartment or the crew's quarters, or any other chamber where the pressure and temperature are to be regulated. Connected in series with the compartment 10 is a second compartment 14 which may house electronic equipment or other mechanism requiring ventilation or cooling.

As shown in Fig. 1, the electronic compartment or chamber 14 is arranged in the pressurized compartment 10 so that it is exteriorly subjected to the pressurized compartment pressure, but it may be arranged to be subjected to any desired pressure such as ambient. Due to restrictions in the path through the electronic compartment, produced by the electronic equipment and the compartment shape and size, a pressure drop in the air stream through the compartment 14 is produced between the inlet 16 and the outlet 18. This pressure drop is a measure of the air flow through the electronic compartment. The exit of the compartment 14 is controlled by a main outflow valve 20. The operation of the outflow valve 20 is controlled by a controller 22 having several pressure responsive elements therein to provide a desired preselected pressure schedule for the pressurized compartment. The controller contains mechanism responsive to the rate of climb, the rate of descent and the pressure difference between the outside and the inside of the pressurized compartment and an isobaric control for maintaining a constant absolute pressure in the compartment under certain flight conditions. These various pressure responsive elements control the pressure in a servo chamber in the regulator outflow valve to position the valve 20 to maintain the selected pressure schedule even with a varying inflow through the inlet pipe 12. This provides for a smooth transition from sea level "unpressurized" conditions to one of the selectable gage pressure settings. A relief valve 24 constituting a second main outflow valve and having a construction somewhat similar to the valve 20 is placed in an opening from the pressurized compartment, and when opened, is adapted to permit air to flow from the pressurized compartment into a discharge compartment 26 which is connected through an orifice 28 to atmospheric or ambient pressure. Valve 20 also discharges into compartment 26. Both valves may, if desired, discharge directly overboard. The servomechanism for actuating valve 24 is controlled primarily by the pressure drop through the electronic compartment.

Mechanism subject to the pressure difference between the pressurized compartment and the ambient pressure is also provided in valve 24 so that the valve 24 will act as a relief valve and will be opened when the pressure difference between the compartment and ambient pressure exceeds a predetermined amount, this being a pressure differential greater than that resulting from operation of the similar pressure differential control 22, whether or not the similar pressure difference control mechanism in the controller 22 is operated or in event of failure of valve 20 to open sufficiently.

Referring to Fig. 2, showing valve 20 in more detail, conduit 30 connects the controller 22 with the servo chamber or cavity 32 of the regulator outflow valve 20 in order to control the pressure in the servo chamber. In general, the controller 22 will connect the line 30 with ambient pressure via the restriction of the controlling elements of valve 22 to reduce the pressure in the servo chamber. The rate of climb element in the controller, however, connects the line 30 with the pressure in the pressurized compartment to increase the servo pressure via controlling restriction.

Valve 20 comprises a rim 34 which is mounted on a flange 36 forming the exit of the electronic chamber 14 and is connected by spaced arms 38, forming discharge gates, to a second rim 40. A plate 42 secured to rim 40 clamps the outer edge of a diaphragm 44 between the rim 40 and the plate 42. The inner edge of the diaphragm 44 is clamped by means of a ring 46 to a reciprocating valve plate 48 having a seat 50 adapted to seat on the rim 34 and block the exit from the compartment 14. Plate 42 carries a hollow stem 52 which acts as a guide for the reciprocating valve element 48. Compression spring 54 acting on plate 42 urges the valve element 48 into seating relation with the rim 34. An elongated bearing sleeve 56 of the valve plate 48 carries on its compartment side a sleeve 58 having inlet holes 60 and a filter 62 for admitting compartment air into the hollow stem 52. A bleed orifice 64 continuously bleeds air from the interior of stem 52 into servo chamber 32. As indicated above, air is bled from the servo chamber through the conduit 30. Pressure force difference on opposite sides of the valve plate 48 and the diaphragm 44 serves to position the valve and regulate the opening of the valve. Equal pressure forces on both sides of the valve plate will permit the spring 54 to close the valve, and a reduction of the pressure force in the servo chamber 32 while the scheduled pressure is maintained in the electronic compartment outlet 18 will open the valve 48. A solenoid actuated valve 66, when energized, opens the servo chamber 32 directly to discharge chamber 26 and ambient pressure so as to open the valve 48 under the influence of electronic compartment pressure.

A closing solenoid valve 68 opens a connection between opposite sides of the valve member 48, which opening is large enough to override the effect of the opening solenoid valve if they should both be opened at the same time. These two solenoid valves are connected with suitable sources of power and switches, not shown, for manual automatically sequenced operation.

The controller shown in Fig. 4 controls the pressure in the pressurized chamber by regulating the pressure in the servo chamber 32 to control the opening and closing of the valve 48 and thus control the outflow of air from the pressurized compartment through the electronic compartment. It should be understood that opening the valve 48 connects the electronic compartment with ambient pressure which is lower than the compartment pressure and thus will tend to reduce the compartment pressure. The controller 22 is connected with the servo chamber by the line 30 which is connected with a conduit 108 in a manifold 110. Valves 112, 114 and 116 control a connection between the conduit 108 and a conduit 118 forming a portion of an exhaust line leading to ambient pressure. Opening of any of these valves will, of course, tend to lower the pressure in servo chamber 32. Valve 120 connects conduit 108 with the pressurized chamber through a filter 122 and when opened will tend to equalize the pressure on both sides of the valve 48 and thus tend to close it. A valve 124 when deenergized serves to connect line 126 and valve 128 with the line 30 and conduit 108. Valve 128, when open, serves to connect line 126 with the ambient exhaust 118 to tend to open valve 48. Valves 114 and 128 accomplish substantially the same purpose, except that valve 114 is controlled by bellows 130 having compartment pressure outside and ambient pressure inside the bellows to maintain a preselected pressure difference between the inside and outside of the pressurized compartment while valve 128 is controlled by bellows 132 having pressurized compartment pressure outside and ambient pressure inside to maintain the pressure difference between the inside and outside of the pressurized compartment at a selected lower pressure difference than that maintained by the bellows 130 and valve 114. Valve 116 is controlled by an evacuated bellows 134 to maintain a preselected absolute pressure in the pressurized compartment and is overridden in a well known manner by valves 114 and 128 and when that pressure would produce an excessive pressure difference between the inside and outside of the pressurized chamber. Valve 120 is controlled by a bellows 136, the interior of which is vented to pressurized compartment pressure by a porous bleed member 138 so as to be responsive to rates of change of compartment pressure. In the event that the rate of reduction of pressurized compartment pressure should exceed a preselected amount, valve 120 would be actuated to close the outlet valve 48 to slow up the pressure reduction. Valve 112 is actuated by bellows 140 having a bleed, not shown, similar to that shown in connection with bellows 136 and is arranged to be actuated upon an increase in compartment pressure at a rate greater than a predetermined rate to open valve 112 to ambient pressure and thus tend to open the outlet valve 48 and slow up the increase in pressurized compartment pressure. Bellows 136 would normally be actuated when the rate of climb exceeds a predetermined value, or the valve 124 is actuated to change from a high pressure differential to a lower one and bellows 140 would be actuated when the rate of descent exceeds a predetermined amount or the valve 124 is actuated to change from a low pressure differential to a higher one. All of the bellows are subjected exteriorly to the pressurized compartment pressure and have one side fixed to a fixed portion of the controller 22.

From the above description, it will be apparent that under control of the several elements of the controller 22, the valve 20 will act to maintain a desired pressure schedule in the pressurized compartment and control the air flow through the electronic compartment.

The design and construction of the electronic compartment or chamber is such that it is desired to limit the pressure drop or the air flow through the electronic compartment. It has been found in one specific application that a drop of a pound and one-half from the entrance to the exit of the electronic compartment is about all that is required or should be permitted.

In order to take care of any excess flow necessary to bring the compartment temperature within a scheduled temperature range, the safety valve 24, which is provided for the compartment, is modified to act as an auxiliary regulator valve.

As shown in Fig. 3, the auxiliary discharge and safety valve 24 is constructed generally the same as regulator outflow valve 20, but has a different set of control valves carried by the plate 70 forming the closure member for the servo chamber or cavity 72 in a manner similar to the plate 42 on the valve 20. The valve member 74 is subjected on the pressure compartment side to compartment pressure and on the opposite side to servo chamber pressure and is actuated by the pressure difference on the opposite sides, a spring 76 acting to urge the valve member 74 onto its seat. Pressurized compartment pressure is bled through conduit 78 into channel 80, opening onto one side of a diaphragm 82 controlling the valve 84. Air on the opposite side of diaphragm 82 is connected with ambient pressure through a line 86. When the difference between the cabin and the ambient pressure exceeds a preselected amount, diaphragm 82 will be actuated to open valve 84 and drain servo chamber 72 through channel 88, valve 84 and channel 90 which is connected with the discharge chamber 26 and ambient pressure. This will act to open the valve 74 to provide a discharge path for pressurized compartment air and thus tend to reduce the compartment pressure. The pressurized compartment is also connected through line 78 and a line 94 with one side of a diaphragm 96 controlling a valve 98. The other side of the diaphragm 96 is connected by means of a line 100 to the outlet 18 of the electronic compartment so that the diaphragm 96 is subjected to the pressure difference between the pressurized compartment pressure which is the electronic compartment inlet pressure and the electronic compartment outlet pressure, which pressure difference is a measure of the flow through the electronic compartment. When the pressure drop or the flow through the electronic compartment exceeds a preselected value, diaphragm 96 will be actuated to open valve 98 and drain servo chamber 72 through channel 88, valve 98 and pipe 102. Pipe 102 is connected to the servo chamber 32 of valve 20 and through that servo chamber with line 30 leading to the controller 22.

The pressure chamber 72 is supplied with air from the pressurized chamber through line 78, filter 92 and a bleed 104 continuously bleeding into passage 88. Air is bled continuously from the chamber 72 through a bleed line 106 connecting lines 88 and 102 around the valve 98 so that the bleed from the chamber 72 is under control of the controller 22 and the pressure in the servo chamber 72 is normally larger than the pressure in the servo chamber 32 by an amount equal to the pressure drop through bleed 106. The valve 20 is, however, designed to regulate under control of the controller 22 without effecting actuation of the valve element 74 of the valve 24. Hence, if the controller 22 is calling for a reduction in pressurized compartment pressure, valve 20 will open until it establishes the predetermined flow or pressure drop through the electronic compartment before valve 24 will be actuated. This will permit all of the pressurized compartment air to be discharged through the electronic compartment up to the preselected flow capacity of, or the preselected pressure drop through, the electronic compartment. If the pressurized compartment requires a greater quantity of air for cooling purposes than can be forced through the electronic compartment within the limited permissible pressure drop through the electronic compartment, then the pressurized compartment pressure will tend to increase or the static pressure at the outlet of the electronic compartment will tend to decrease, or both, and produce a pressure differential between the electronic compartment and the pressurized compartment sufficient to open the valve 98. Under high flow conditions through the electronic compartment the static pressure on the internal surface of the electronic compartment walls is decreased although the total pressure within the chamber may remain essentially constant. It is at these times that the danger of collapsing the walls of the electronic compartment is the greatest. As the controller is still calling for a reduction in compartment pressure, the bleed through line 30 leading to the controller and also through line 102 leading from servo chamber 72 will be sufficient to then reduce the pressure in servo chamber 72 to an amount which will effect the opening of valve 74 to limit the drop across the wall of the electronic compartment by opening a parallel exit passage for the cabin air. Under these conditions, with pressure differential valve 98 open, valve 74 will act under control of the controller 22 to assist in maintaining the pressure schedule in the pressurized compartment 10 which was previously being maintained by the valve 20 while at the same time limiting the pressure drop through the electronic compartment. When the flow as measured by the static pressure drop through the compartment 14 returns to, or below, the preselected amount, valve 98 will close and the control will be returned to valve 20 to maintain the pressurized compartment pressure by regulating the flow through the electronic compartment.

By connecting the control line 102 from servo chamber 72 of valve chamber 74 through the servo compartment 32 of the valve 20, a more stable operation is effected.

If the discharge from the chamber 72 were connected directly to ambient pressure without going through compartment 32, actuation of valve 98 by a predetermined increase in pressure difference between the inlet and outlet of the electronic compartment would, by opening chamber 72, tend to rapidly reduce the pressurized compartment pressure.

This opening of valve 74 immediately reduces the pressurized compartment pressure, violating the control of the cabin pressure by valve 22. Valve 22 then senses that the cabin pressure is too low and acts to close valve 48 to restore the cabin pressure. Closure of valve 48 reduces the differential pressure across the electronic compartment wall which, acting through valve 98, will close the valve 74. Valve 48 being in a more closed position than originally and valve 74 being closed, a greater pressure drop exists across valve 20 for a given air flow which is determined by the cabin temperature and the cabin pressure is higher than existed at the beginning of this cycle. Controller 22 now senses too high a cabin pressure and opens valve 48, reducing the pressure across the electronic compartment wall and producing a pressure differential sufficient to again open valve 98 and valve 74 to again reduce the pressurized compartment pressure, violate the control by controller 22, and start the cycle all over again.

Such conditions where actuation of one valve affects the actuation of the other, but with a time lag between, are conducive to instability due to the lag between the opening of the valve 74 and its effect on the electronic compartment outlet and the lag between the opening of valve 48 and its effect on the presurized compartment pressure. However, by connecting the outlet of servo chamber 72 through servo chamber 32, it is possible to so relate the opening and closing of the valve 74 and the movement of valve 48 that they will act together to control the pressure in the pressurized compartment at maximum flow conditions in the electronic compartment. Under these maximum flow conditions, any request by the controller 22 for a reduction in pressurized compartment pressure would tend to reduce the pressure in line 30 and chamber 32 and open valve 48 but such a request also would be an indication that the pressure differential across the electronic compartment had increased due to the increase in pressurized compartment pressure and would result in further opening of valve 98, which is responsive to that pressure differential, tending to increase the flow through line 102 to chamber 32. This increased flow from chamber 72 of valve 24 to chamber 32 of valve 20 will reduce the effect of controller 22 on chamber 32 and hence properly distribute the movement between the two halves. Thus the action of the two valves is stabilized and the surging and oscillation incident to individual operation and separate control of the two valves is controlled.

While the electronic compartment has been shown as physically located within the pressurized compartment with a regulator outflow valve at the outlet of the electronic compartment, it should be understood that the electronic compartment may be placed outside of the pressurized compartment and the regulator outflow valve may be placed at the inlet of the electronic compartment. This would then provide a bursting instead of a collapsing pressure on the electronic compartment, but the pressure limitation would be substantially the same. The pressure difference would be measured between ambient pressure or whatever pressure was outside of the electronic compartment and the pressure at the inlet of the electronic compartment. The valve diaphragm 96 would be actuated by this pressure difference. Control of the pressure in the pressurized compartment would be substantially the same as that described above.

Although only one embodiment has been shown and described herein, it will be apparent that various changes and modifications may be made in the construction and arrangement of the various parts without departing from the scope of this novel concept.

I claim:

1. In combination, a pressurized chamber having fluid continuously flowing into said chamber and having two main discharge flow paths from said chamber, one discharge path comprising a compartment having a flow restriction therein connected in series with said chamber, said flow restriction producing a pressure drop incident to fluid flow through said compartment, a first valve controlling flow through said compartment, valve actuating mechanism, a pressure sensing controller sensing the pressure in said chamber and operatively connected with said valve actuating mechanism for controlling the pressure in said chamber by regulating said valve to control the fluid flow through said compartment, said chamber and said one main discharge path, a second valve controlling said other main discharge path, actuating means for said second valve, and a controller responsive to said pressure drop controlling said second valve actuating means.

2. A combination as claimed in claim 1 in which said first valve actuating mechanism comprises servo mechanism having compartment pressure on one side and pressure controlled by said pressure sensing controller on the other side.

3. A combination as claimed in claim 1 in which said second valve actuating mechanism comprises servo mechanism having chamber pressure on one side and pressure controlled by said pressure drop responsive means on the other side.

4. A combination as claimed in claim 3 including means actuated by the pressure difference between the inside and outside of said chamber also controlling the pressure on the other side of said servo mechanism.

5. A combination as claimed in claim 1 in which each valve actuating mechanism comprises servo mechanism including a servo cavity into which fluid is continuously bled from said chamber and each controller controls the pressure in its respective servo cavity.

6. A combination as claimed in claim 5 in which the servo cavities are interconnected by a continuously open conduit.

7. A control device for controlling the pressure in a pressurized chamber, having fluid flowing into said chamber, a compartment in series with said chamber, a valve actuated by compartment pressure and controlled by chamber pressure controlling the flow through said chamber and compartment, a valve venting said chamber and means responsive to flow through said compartment for controlling said venting valve.

8. A device as claimed in claim 7 including means responsive to the difference in pressure between the inside and the outside of said chamber also controlling the actuation of said venting valve.

9. A control device for controlling the pressure in a pressurized chamber, having fluid flowing into said chamber, a compartment in series with said chamber, a valve controlling the main flow through said compartment and chamber, pressure responsive means exposed to chamber pressure for controlling said valve, a valve subject to intermittent operation for venting said chamber and means responsive to the pressure drop through said compartment for opening said venting valve only when said flow exceeds a predetermined amount.

10. A device as claimed in claim 9 in which said venting valve is also actuable by mechanism responsive to an increase in said chamber pressure a predetermined amount above the pressure outside of said chamber.

11. A control device for controlling the pressure in a chamber having a continuous flow of fluid therethrough, valve means controlling a first main flow path from said chamber, servo means for actuating said valve means including a servo cavity and a bleed from said chamber for supplying pressure fluid to said cavity, a compartment arranged in series with said chamber and adapted to transmit flow of fluid from said chamber through a second main flow path to an exit, means responsive to the pressure in said chamber controlling said chamber pressure by controlling said exit and means responsive to the pressure drop through said compartment controlling the pressure in said servo cavity to control said valve and limit the flow rate through said compartment.

12. A device as claimed in claim 11 in which the means controlling through said compartment comprises a valve at the outlet of said compartment and servo mechanism responsive to the pressure in said chamber controlling said valve.

13. A device as claimed in claim 12 in which said compartment is contained within said chamber and said valve means controls said first main flow path to provide a parallel discharge from said chamber and mechanism responsive to the difference in pressure between the pressure in said chamber and the pressure at the outlet of said compartment is effective to actuate said valve means.

14. A device as claimed in claim 13 in which mechanism responsive to the pressure differential across said chamber is also effective to actuate said valve means.

15. In combination with two chambers arranged in series to provide a main flow path through both chambers in series, means for introducing fluid under pressure into the first chamber of said series, means at the exit of the second chamber responsive to the pressure in said first chamber regulating the pressure in said first chamber by controlling the flow of fluid through said main flow path from said first chamber through the second chamber and means limiting the flow through the second chamber by venting said first chamber.

16. In combination with two chambers arranged in series to provide a main flow path through both chambers in series, means for introducing fluid under pressure into the first chamber of said series, means actuated by the pressure in said second chamber and responsive to the pressure in said first chamber regulating the pressure in said first chamber by controlling the flow of fluid through said main flow path from said first chamber through said second chamber and means including means responsive to the pressure drop through said second chamber limiting the flow through said second chamber by venting said first chamber.

17. A device as claimed in claim 16 including means interconnecting the actuating mechanism of said regulating and limiting means for stabilizing the action of said two responsive means.

18. In combination with a first chamber having an air inlet introducing a variable quantity of air to said chamber and two air outlets for discharging said air from said chamber, one outlet comprising a second chamber containing mechanism to be cooled, valves controlling said outlets, means responsive to the pressure in said first chamber controlling the valve for the outlet of said second chamber and means responsive to the flow through said second chamber controlling the valve for the other outlet.

19. A combination as claimed in claim 18 in which said controlling means for the valve for the other outlet includes additional means responsive to the pressure difference between the inside and outside of the first chamber.

20. In an air conditioning system for an aircraft, a first chamber, in which the air temperature and pressure are to be controlled, and in which said temperature is at least partially controlled by varying the quantity of air introduced to said chamber and said pressure is controlled by varying the quantity of air expelled from said chamber, a second chamber arranged in series with said first chamber and having a restricted passage providing an exit for said first chamber and through which the permissible air flow is limited and is to be controlled, a first valve blocking the passage through said second chamber, servo mechanism for actuating said valve, means responsive to the pressure in said first chamber operatively connected with said servo mechanism and controlling the operation of said valve to control said pressure by controlling said flow, a second valve controlling a second exit from said first chamber, servo mechanism for actuating said second valve, means responsive to the pressure difference between the inlet and the outlet of said second chamber connected with said second valve servo mechanism for limiting the flow through said second chamber by actuating said second valve to control flow through said second exit.

21. In a system as claimed in claim 20, valve actuating mechanism in which each said servo mechanism comprises a respective servo chamber and means continuously bleeding air under pressure into said respective servo chambers, a line connected with said servo mechanism for said first valve and leading through control mechanism to provide a regulating pressure, and a conduit interconnecting said servo chambers.

22. In a system as claimed in claim 21 valve actuating mechanism including a continuous bleed from the servo chamber for said second valve to said conduit.

23. In a system as claimed in claim 22 valve actuating mechanism including a valve responsive to the pressure drop through said second chamber connecting the servo chamber of said second valve with said conduit.

24. In a system as claimed in claim 23 means responsive to bursting pressure acting on said first chamber for actuating said second valve.

25. In combination with a pressurized chamber having fluid continuously flowing into said chamber and a compartment arranged in series with said chamber to act as a main discharge flow path from said chamber and having a restriction producing a pressure drop in the fluid flow between the inlet and outlet of said compartment, valve means controlling the flow through said compartment including a servo mechanism with a servo cavity, means continuously bleeding fluid into said cavity and means responsive to chamber pressure controlling the flow out of said cavity, a safety valve controlling a vent from said chamber, servo means for actuating said safety valve, including means responsive to the bursting pressure in said chamber for actuating said servo means, and means responsive to said pressure drop for also actuating said servo means.

26. The combination claimed in claim 25 in which said servo means includes a servo cavity having a bleed connection with said chamber, means actuated by said bursting pressure responsive means controlling a bleed from said servo means cavity, and means actuated by said pressure drop controlling another bleed from said servo means cavity.

27. The combination claimed in claim 26 including conduit means interconnecting said servo cavities.

References Cited in the file of this patent

UNITED STATES PATENTS

| 2,439,793 | Braddon | Apr. 20, 1948 |
| 2,463,487 | Widgery et al. | Mar. 1, 1949 |
| 2,569,537 | Robbins | Oct. 2, 1951 |
| 2,590,330 | Krueger | Mar. 25, 1952 |
| 2,621,577 | Cooper et al. | Dec. 16, 1952 |
| 2,814,241 | Silver | Nov. 26, 1957 |

UNITED STATES PATENT OFFICE

CERTIFICATE OF CORRECTION

Patent No. 2,905,071September 22, 1959

Rudolph E. Krueger

It is hereby certified that error appears in the printed specification of the above numbered patent requiring correction and that the said Letters Patent should read as corrected below.

Column 8, line 22, after "controlling" insert -- flow --.

Signed and sealed this 22nd day of March 1960.

(SEAL)
Attest:

KARL H. AXLINE
Attesting Officer

ROBERT C. WATSON
Commissioner of Patent